United States Patent
Subramaniam et al.

(10) Patent No.: US 12,504,191 B2
(45) Date of Patent: Dec. 23, 2025

(54) SYSTEM AND METHOD FOR DETECTING A LOOSE BLOWER WHEEL OF A HEATING, VENTILATION, AND AIR CONDITIONING SYSTEM

(71) Applicant: Lennox Industries Inc., Richardson, TX (US)

(72) Inventors: Palanivel Subramaniam, Richardson, TX (US); Sean Nicholas Lopes, Dallas, TX (US)

(73) Assignee: Lennox Industries Inc., Richardson, TX (US)

( * ) Notice: Subject to any disclaimer, the term of this patent is extended or adjusted under 35 U.S.C. 154(b) by 366 days.

(21) Appl. No.: 18/340,991

(22) Filed: Jun. 26, 2023

(65) Prior Publication Data
US 2024/0426497 A1    Dec. 26, 2024

(51) Int. Cl.
| | | |
|---|---|---|
| G06F 3/048 | (2013.01) |
| F24F 11/38 | (2018.01) |
| F24F 11/64 | (2018.01) |
| F24F 11/77 | (2018.01) |
| F24F 140/60 | (2018.01) |

(52) U.S. Cl.
CPC .............. F24F 11/38 (2018.01); F24F 11/64 (2018.01); F24F 11/77 (2018.01); *F24F 2140/60* (2018.01)

(58) Field of Classification Search
CPC .. F24F 11/38; F24F 11/64; F24F 11/77; F24F 2140/60
See application file for complete search history.

(56) References Cited

U.S. PATENT DOCUMENTS

| | | | |
|---|---|---|---|
| 9,644,856 B1 * | 5/2017 | Francis | F24F 11/49 |
| 11,255,558 B1 * | 2/2022 | Kraft | F24F 11/64 |
| 2008/0188173 A1 * | 8/2008 | Chen | F24F 11/77 454/239 |
| 2016/0216718 A1 * | 7/2016 | Powell | F04D 27/004 |
| 2018/0202679 A1 * | 7/2018 | Berg | G01M 99/008 |
| 2023/0264705 A1 * | 8/2023 | Nakano | B60W 50/10 701/1 |

* cited by examiner

*Primary Examiner* — Aleksey Olshannikov
(74) *Attorney, Agent, or Firm* — Baker Botts L.L.P

(57) ABSTRACT

A method includes entering a blower monitoring mode for a blower of a heating, ventilation, and air conditioning (HVAC) system. A torque applied to a blower wheel of the blower is determined based on an electrical current and an electrical voltage provided to a motor of the blower. In response to determining that the torque is greater than or equal to a torque threshold, a speed of the blower wheel is determined based on the electrical current and the electrical voltage provided to the motor. In response to determining that the speed is less than a speed threshold, a time that passed since both the torque reached the torque threshold and the speed was identified as being less than the speed threshold is determined. In response to determining that the time is greater than or equal to the time threshold, the method determines that the blower wheel is loose.

20 Claims, 5 Drawing Sheets

SYSTEM AND METHOD FOR DETECTING A LOOSE BLOWER WHEEL OF A HEATING, VENTILATION, AND AIR CONDITIONING SYSTEM

TECHNICAL FIELD

The present disclosure relates generally to Heating, Ventilation, and Air Conditioning (HVAC) system control, and more specifically to a system and method for detecting a loose blower wheel of an HVAC system.

BACKGROUND

Existing heating, ventilation, and air conditioning (HVAC) systems typically can only provide a general alert when there is an issue with an HVAC system. For example, the HVAC system may report that an error has occurred while trying to operate the HVAC system and that a service is required to repair the HVAC system. Existing HVAC systems cannot typically self-diagnose any issues with the HVAC system. This means that a technician will need to inspect the HVAC system and make repairs to the HVAC system. In many instances, a technician will need to make multiple trips to a location to first diagnose the issue with an HVAC system and then to return with the appropriate parts and tools for servicing the HVAC system. This process results in an extended amount of downtime while the technician diagnoses and makes repairs to the HVAC system.

SUMMARY

The system disclosed in the present application provides a technical solution to the technical problems discussed above by providing a monitoring system that is configured to detect a loose blower wheel of an HVAC system.

The monitoring system is communicatively coupled to a thermostat and the HVAC system. The monitoring system identifies a blower type of a blower of the HVAC system and enters a blower monitoring mode. An electrical voltage sensor that is coupled to the blower senses an electrical voltage provided to a motor of the blower. An electrical current sensor that is coupled to the blower senses an electrical current provided to the motor of the blower. The monitoring system receives the sensed electrical voltage from the electrical voltage sensor and the sensed electrical current from the electrical current sensor. The monitoring system determines a torque applied to a blower wheel of the blower based on the sensed electrical current and the sensed electrical voltage.

In response to determining that the torque is greater than or equal to a torque threshold, the monitoring system determines a speed of the blower wheel based on the sensed electrical current and the sensed electrical voltage. In response to determining that the speed is less than a speed threshold, the monitoring system determines a time that passed since both the torque reached the torque threshold and the speed was determined as being less than the speed threshold for the first time.

In response to determining that the time is greater than or equal to a time threshold, the monitoring system determines that the blower has a loose blower wheel, shuts down the blower and sends a notification to the thermostat that the blower has the loose blower wheel. The thermostat displays the notification. The monitoring system resets the time. The monitoring system waits for an idle time and restarts the monitoring processes. The monitoring process may be performed in a loop until monitoring of the blower is no longer needed.

The disclosed system provides several practical applications and technical advantages which include a process that enables a user of an HVAC system to detect a loose blower wheel within the HVAC system. These features reduce the amount of downtime that the HVAC system will experience because the monitoring process allows for detecting the loose blower wheel before the malfunctioning of the blower wheel results in an abnormal noise while operating the blower and a failure of the blower wheel. This process allows the user to provide diagnostic information to a technician, such that the technician is prepared with all of the necessary equipment (i.e., parts and tools) and instructions for servicing the HVAC system without having to first diagnose the HVAC system themselves.

In one embodiment, a system includes a heating, ventilation, and air conditioning (HVAC) system. The HVAC system includes a blower, a current sensor communicatively coupled to the blower, and a voltage sensor communicatively coupled to the blower. The current sensor is configured to sense an electrical current provided to the motor. The voltage sensor is configured to sense an electrical voltage provided to the motor. The blower includes a motor and a blower wheel attached to the motor. The HVAC system further includes a monitoring system communicatively coupled to the blower. The monitoring system includes a memory and a processor communicatively coupled to the memory. The memory configured to store a torque threshold, a speed threshold, and a time threshold. The processor is configured to enter a blower monitoring mode, receive a first sensed electrical current from the current sensor, receive a first sensed electrical voltage from the voltage sensor, determine a first torque applied to the blower wheel based on the first sensed electrical current and the first sensed electrical voltage, and compare the first torque to the torque threshold. In response to determining that the first torque is greater than or equal to the torque threshold, the processor is further configured to determine a first speed of the blower wheel based on the first sensed electrical current and the first sensed electrical voltage, and compare the first speed to the speed threshold. In response to determining that the first speed is less than the speed threshold, the processor is further configured to determine a first time that passed since both the first torque reached the torque threshold and the first speed was identified as being less than the speed threshold, and compare the first time to the time threshold. In response to determining that the first time is greater than or equal to the time threshold, the processor is further configured to determine that the blower wheel is loose.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
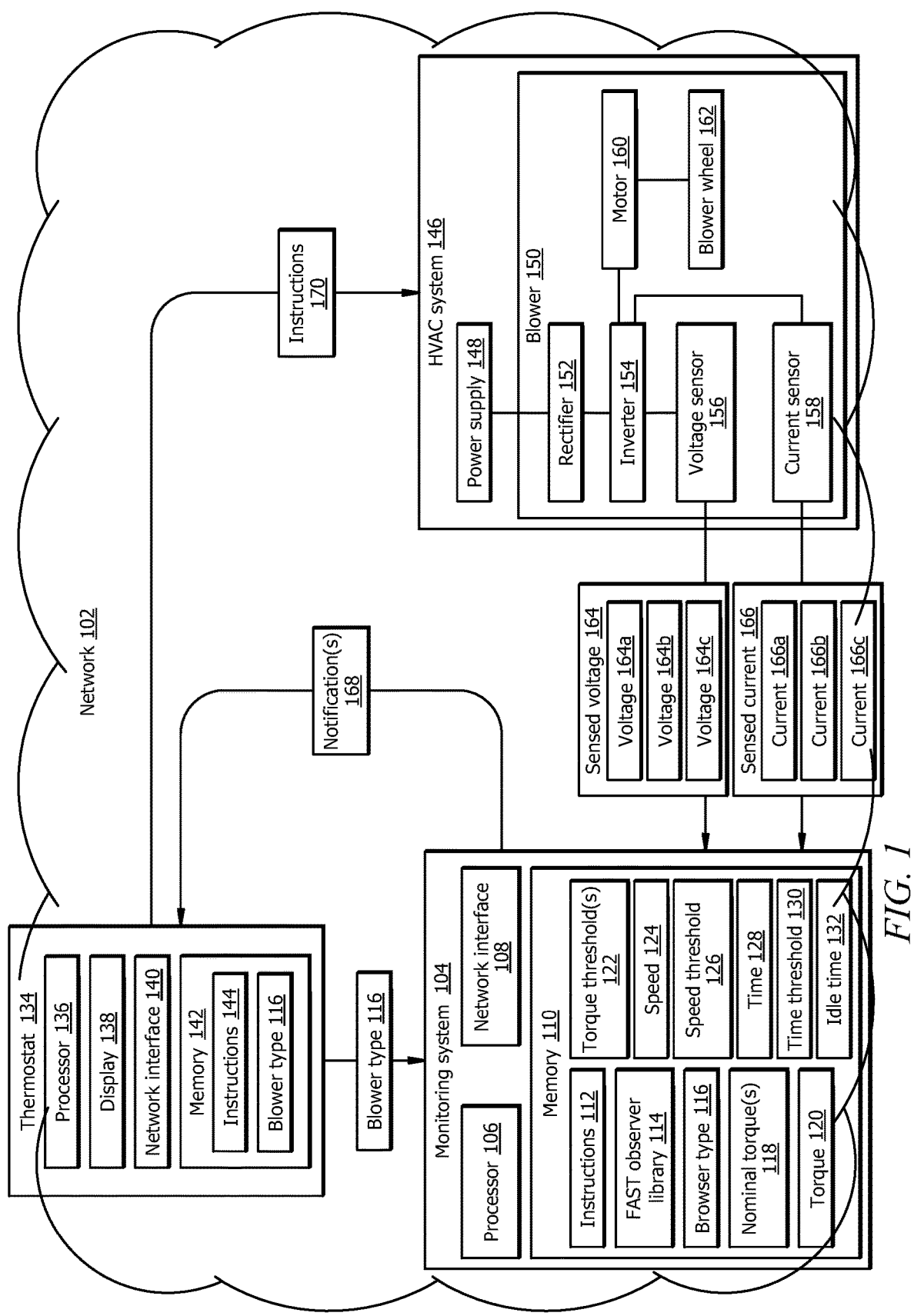
FIG. 1 is a schematic diagram of an embodiment of a monitoring system for a blower of an HVAC system.

FIG. 1 is a schematic diagram of an embodiment of a monitoring system 104 for a blower 150 of a heating, ventilation, and air conditioning (HVAC) system 146. In one embodiment, the monitoring system 104 is communicatively coupled to a thermostat 134 and the HVAC system 146 over a network 102. Network 102 enables the communication between the monitoring system 104, the thermostat 134 and the HVAC system 146. In other embodiments, the monitoring system 104, the thermostat 134 and the HVAC system 146 may not have all the components listed and/or may have other elements instead of, or in addition to, those listed above. For example, functionalities of the monitoring system 104 may be fully or partially integrated into the thermostat 134. For another example, functionalities of monitoring system 104 may be fully or partially integrated into the HVAC system 146.

In general, the monitoring system 104 identifies a blower type 116 of a blower 150 of the HVAC system 146 and enters a blower monitoring mode. An electrical voltage sensor 156 that is coupled to the blower 150 senses an electrical voltage 164 provided to a motor 160 of the blower 150. An electrical current sensor 158 that is coupled to the blower 150 senses an electrical current 166 provided to the motor 160 of the blower 150. The monitoring system 104 receives the sensed electrical voltage 164 from the electrical voltage sensor 156 and the sensed electrical current 166 from the electrical current sensor 158. The monitoring system 104 determines a torque 120 applied to a blower wheel 162 of the blower 150 based on the sensed electrical current 166 and the sensed electrical voltage 164.

In response to determining that the torque 120 is greater than or equal to a torque threshold 122, the monitoring system 104 determines a speed 124 of the blower wheel 162 based on the sensed electrical current 166 and the sensed electrical voltage 164. In response to determining that the speed 124 is less than a speed threshold 126, the monitoring system 104 determines a time 128 that passed since both the torque 120 reached the torque threshold 122 and the speed 124 was determined as being less than the speed threshold 126 for the first time.

In response to determining that the time 128 is greater than or equal to a time threshold 130, the monitoring system 104 determines that the blower 150 has a loose blower wheel 162. The monitoring system 104 shuts down the blower 150 and sends a notification 168 to the thermostat 134 that the blower 150 has the loose blower wheel 162. The thermostat 134 displays the notification 168. The monitoring system 104 resets the time 128. The monitoring system 104 waits for an idle time 132 and restarts the monitoring processes. The monitoring process may be performed in a loop until monitoring of the blower 150 is no longer needed. In certain embodiments, monitoring process 400 allows for detecting the loose blower wheel 162 before the malfunctioning of the blower wheel 162 results in an abnormal noise while operating the blower 150.

System Components

Network

The network 102 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 102 may be configured to support any suitable type of communication protocol as would be appreciated by one of ordinary skill in the art.

Monitoring System

The monitoring system 104 is generally any device that is configured to process data and interact with the thermostat 134 and the HVAC system 146. The monitoring system 104 may comprise a processor 106 in signal communication with a memory 110 and a network interface 108.

The processor 106 comprises one or more processors operably coupled to the memory 110. The processor 106 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 106 may be a programmable logic device, a microcontroller, a microprocessor, or any suitable combination of the preceding. The processor 106 is communicatively coupled to and is in signal communication with the memory 110 and the network interface 108. The one or more processors are configured to process data and may be implemented in hardware or software. For example, the processor 106 may be 8-bit, 16-bit, 32-bit, 64-bit, or of any other suitable architecture. The one or more processors are configured to implement various instructions. For example, the one or more processors are configured to execute instructions 112 and a flux, angle, speed, torque (FAST) observer library 114 to implement various functions of the monitoring system 104. In this way, processor 106 may be a special-purpose computer designed to implement the functions disclosed herein. In certain embodiments, the FAST observer library 114 may be provided by Texas Instruments, Inc.

In certain embodiments, the memory 110 may further store various parameters that is used by the monitoring system 104 to perform various monitoring operations. The parameters may include a blower type 116, one or more nominal torques 118, a torque 120, one or more torque thresholds 122, a speed 124, a speed threshold 126, a time 128, a time threshold 130, and an idle time 132. These parameters are described below in greater detail.

The network interface 108 is configured to enable wired and/or wireless communications. The network interface 108 is configured to communicate data between the monitoring system 104 and other components such as the thermostat 134 and the HVAC system 146. For example, the network interface 108 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 106 is configured to send and receive data using the network interface 108. The network interface 108 may be configured to use any suitable type of communication protocol as would be appreciated by one of ordinary skill in the art.

The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM). The memory 110 is operable to store any of the information described herein with respect to FIGS. 1, 2, 3, 4A and 4B along with any other data, instructions, logic, rules, or code operable to implement the function(s) described herein when executed by the processor 106. The memory 110 is operable to store the instructions 112, the FAST observer library 114, and/or any other data or instructions that is used by the processor 106 to perform the function(s) of the monitoring system 104 described herein. The instructions 112 and the FAST observer library 114 may comprise any suitable set of instructions, logic, rules, or code operable to implement the function(s) of the monitoring system 104 when executed by the processor 106. In certain embodiments, the FAST observer library 114 may be provided by Texas Instruments, Inc.

In operation, the processor 106 of the monitoring system 104 identifies a blower type 116 of a blower 150 of an HVAC system 146 and enters a blower monitoring mode. In certain embodiments, the processor 106 of the monitoring system 104 receives the blower type 116 from a thermostat 134. The blower type 116 may be a one horsepower (HP) blower, ¾ HP blower, or ½ HP blower.

An electrical voltage sensor 156 that is coupled to the blower 150 senses an electrical voltage 164 provided to a motor 160 of the blower 150. In certain embodiments, the electrical voltage 164 is a three-phase electrical voltage and comprises voltages 164a, 164b, and 164c corresponding to respective phases.

An electrical current sensor 158 that is coupled to the blower 150 senses an electrical current 166 provided to the motor 160 of the blower 150. In certain embodiments, the electrical current 166 is a three-phase electrical voltage and comprises current 164a, 164b, and 164c corresponding to respective phases.

The processor 106 of the monitoring system 104 receives the sensed electrical voltage 164 from the electrical voltage sensor 156 and the sensed electrical current 166 from the electrical current sensor 158.

The processor 106 of the monitoring system 104 determines a torque applied to a blower wheel 162 of the blower 150 based on the sensed electrical current 166 and the sensed electrical voltage 164. In certain embodiments, the processor 106 of the monitoring system 104 executes the FAST observer library 114 to determine the torque 120.

The processor 106 of the monitoring system 104 compares the torque 120 to a torque threshold 122. In certain embodiments, the torque threshold 122 equal to 15% of a nominal torque 118. In embodiments when the blower 150 is 1 HP blower, the nominal torque 118 is 85 ounce-feet (oz-ft) and the torque threshold 122 is 12.75 oz-ft. In embodiments when the blower 150 is ¾ HP blower, the nominal torque 118 is 63 ounce-feet (oz-ft) and the torque threshold 122 is 9.45 oz-ft. In embodiments when the blower 150 is ½ HP blower, the nominal torque 118 is 42 ounce-feet (oz-ft) and the torque threshold 122 is 6.3 oz-ft.

In response to determining that the torque 120 is greater than or equal to the torque threshold 122, the processor 106 of the monitoring system 104 determines a speed 124 of the blower wheel 162 based on the sensed electrical current 166 and the sensed electrical voltage 164. In certain embodiments, the processor 106 of the monitoring system 104 executes the FAST observer library 114 to determine speed 124 of the blower wheel 162. The processor 106 of the monitoring system 104 compares the speed 124 to a speed threshold 126. In one embodiment, the speed threshold 126 is 52.5 revolutions per minute (rpm).

In response to determining that the speed 124 is less than the speed threshold 126, the processor 106 of the monitoring system 104 determines a time 128 that passed since both the torque 120 reached the torque threshold 122 and the speed 124 was determined as being less than the speed threshold 126 for the first time. The processor 106 of the monitoring system 104 compares the time 128 to a time threshold 130. In one embodiment, the time threshold 130 is 180 sec.

In response to determining that the time 128 is greater than or equal to the time threshold 130, the processor 106 of the monitoring system 104 determines that the blower 150 has a loose blower wheel 162. The processor 106 of the monitoring system 104 shuts down the blower 150 and sends a notification 168 to the thermostat 134 that the blower 150 has the loose blower wheel 162. The processor 106 of the monitoring system 104 resets the time 128. The processor 106 of the monitoring system 104 waits for an idle time 132 and restarts the monitoring process. In one embodiment, idle time 132 is 10 min. The processor 106 of the monitoring system 104 may perform the monitoring process in a loop until monitoring of the blower 150 is no longer needed. In certain embodiments, the monitoring system 104 allows for detecting the loose blower wheel 162 before the malfunctioning of the blower wheel 162 results in an abnormal noise while operating the blower 150.

Thermostat

The thermostat 134 is generally configured to control various operations of the HVAC system 146. In one embodiment, the thermostat 134 comprises a processor 136 in signal communication with a display 138, a memory 142 and a network interface 140.

The display 138 is a graphical user interface that is configured to present visual information using graphical objects. Examples of the display 138 include, but are not limited to, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art. The display 138 may be configured to have touch screen functionality.

The processor 136 may be similar to the processor 106 and the description is not repeated herein. The processor 136 is configured to implement various instructions. For example, the processor 136 is configured to execute instructions 144 to implement various functions of the thermostat 134.

The network interface 140 may be similar to the network interface 108 and the description is not repeated herein. The network interface 140 is configured to enable wired and/or wireless communications. The network interface 140 is configured to communicate data between the thermostat 134 and other components such as the monitoring system 104 and the HVAC system 146.

The memory 142 may be similar to the memory 110 and the description is not repeated herein. The memory 142 is operable to store any of the information described herein with respect to FIGS. 1, 2, 3, 4A and 4B along with any other data, instructions, logic, rules, or code operable to implement the function(s) described herein when executed by the processor 136. The memory 142 is operable to store the instructions 144, and/or any other data or instructions that is used by the processor 136 to perform the function(s) of the thermostat 134 described herein. The instructions 144 may comprise any suitable set of instructions, logic, rules, or code operable to implement the function(s) of the thermostat 134 when executed by the processor 136. The memory 142 may further store various information for the HVAC system 146. For example, the memory 142 may store a blower type 116 of a blower 150 of the HVAC system 146.

In operation, the thermostat 134 is configured to send various instructions (e.g., instructions 170) to the HVAC system 146 to control various operations of the HVAC system 146. The thermostat 134 is further configured to receive various notifications (e.g., notifications 168) from the monitoring system 104. In certain embodiments, the thermostat 134 may display various notifications (e.g., notifications 168) using the display 138.

HVAC System

An HVAC system 146 is generally configured to control the temperature of a space. Examples of the space include, but are not limited to, a room, a home, an apartment, a mall, an office, a warehouse, or a building. Although FIG. 1 illustrates a single HVAC system 146, a location or space may comprise a plurality of HVAC systems 146 that are configured to work together. For example, a large building may comprise multiple HVAC systems 146 that work cooperatively to control the temperature within the building.

The HVAC system 146 conditions air for delivery to an interior space of a building or home. In the illustrated embodiment, the HVAC system 146 comprises a blower 150 coupled to a power supply 148. The HVAC system 146 further comprises other components that not illustrated due to clarity. More detailed structure of an HVAC system is described below with reference to FIG. 2. In certain embodiments, the power supply 148 may be an alternating current (AC) power supply. The blower 150 may include a rectifier 152 and an inverter 154 coupled to a motor 160. The rectifier 152 configured to convert AC power from the power supply 148 to a direct current (DC) power. The inverter 154 is configured to convert a DC power from the rectifier 152 to an AC power that is supplied to the motor 160. The motor 160 may be any suitable AC motor, such as a three-phase AC motor. In embodiments when the motor 160 is a three-phase AC motor, the inverter 154 is configured as a three-phase inverter. The blower 150 may further comprise a blower wheel 162 couple to the motor 160. The motor 160 is configured to rotate the rectifier 152. The blower 150 may further comprise an electrical voltage sensor 156 and an electrical current sensor 158 coupled to the inverter 154. The electrical voltage sensor 156 is configured to sense an electrical voltage (e.g., sensed electrical voltage 164) that is provided to by the inverter 154 to the motor 160. In certain embodiments, the electrical voltage sensor 156 may comprise suitable voltmeter circuitry. The electrical current sensor 158 is configured to sense an electrical current (e.g., sensed electrical current 166) that is provided to by the inverter 154 to the motor 160. In certain embodiments, the electrical current sensor 158 may comprise suitable amperemeter circuitry. In embodiments when the inverter 154 is a three-phase inverter, the sensed electrical voltage 164 comprises voltages 164a, 164b, and 164c corresponding to respective phases, and the sensed electrical current 166 comprises currents 166a. 166b, and 166c corresponding to respective phases. In the illustrated embodiment, the electrical voltage sensor 156 and the electrical current sensor 158 are parts of the blower 150. In other embodiments, the electrical voltage sensor 156 and the electrical current sensor 158 integrated into the network interface 140.

Figure 2:
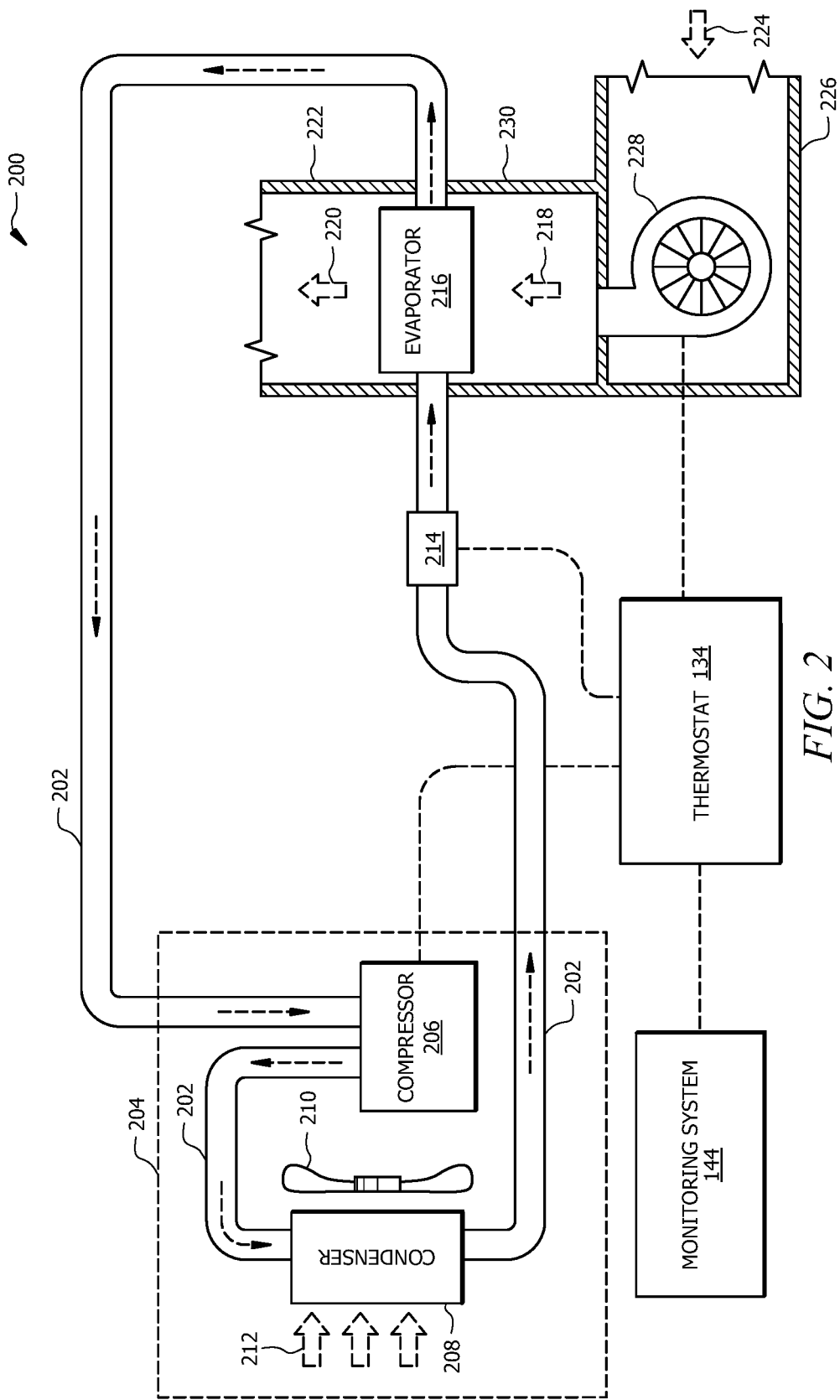
FIG. 2 is a schematic diagram of an embodiment of an HVAC system.

FIG. 2 is a schematic diagram of an embodiment of an HVAC system 200 configured to integrate with the monitoring system 104 and the thermostat 134 (see FIG. 1). The HVAC system 200 may be used to implement the HVAC system 146 (see FIG. 1). The HVAC system 200 conditions air for delivery to a conditioned space (e.g., all or a portion of a room, a house, an office building, a warehouse, or the like). In some embodiments, the HVAC system 200 is a rooftop unit (RTU) that is positioned on the roof of a building, and the conditioned air is delivered to the interior of the building. In other embodiments, portion(s) of the HVAC system 200 may be located within the building and portion(s) outside the building. The HVAC system 200 may include one or more heating elements, not shown for convenience and clarity. The HVAC system 200 may be configured as shown in FIG. 2 or in any other suitable configuration. For example, the HVAC system 200 may include additional components or may omit one or more components shown in FIG. 2.

The HVAC system 200 includes a working-fluid conduit subsystem 202, at least one condensing unit 204, an expansion valve 214, an evaporator 216, and a blower 228. The working-fluid conduit subsystem 202 facilitates the movement of a working fluid (e.g., a refrigerant) through a cooling cycle such that the working fluid flows as illustrated by the dashed arrows in FIG. 2. The working fluid may be any acceptable working fluid including, but not limited to hydroflurocarbons (e.g., R-410A) or any other suitable type of refrigerant.

The condensing unit 204 includes a compressor 206, a condenser 208, and a fan 210. In some embodiments, the condensing unit 204 is an outdoor unit while other components of the HVAC system 200 may be located indoors. In typical embodiments, the compressor 206 is a variable speed compressor that can be operated at a range of speeds. The compressor 206 is coupled to the working-fluid conduit subsystem 202 and compresses (i.e., increases the pressure of) the working fluid.

The condenser 208 is configured to facilitate movement of the working fluid through the working-fluid conduit subsystem 202. The condenser 208 is generally located downstream of the compressor 206 and is configured to remove heat from the working fluid. The fan 210 is configured to move air 212 across the condenser 208. For example, the fan 210 may be configured to blow outside air through the condenser 208 to help cool the working fluid flowing therethrough. The compressed, cooled working fluid flows from the condenser 208 toward the expansion valve 214.

The expansion valve 214 is coupled to the working-fluid conduit subsystem 202 downstream of the condenser 208 and is configured to remove pressure from the working fluid. In this way, the working fluid is delivered to the evaporator 216. In general, the expansion valve 214 may be a valve such as an expansion valve or a flow control valve (e.g., a thermostatic expansion valve (TXV)) or any other suitable valve for removing pressure from the working fluid while, optionally, providing control of the rate of flow of the working fluid.

The evaporator 216 is generally any heat exchanger configured to provide heat transfer between air flowing through (or across) the evaporator 216 (i.e., airflow 218 contacting an outer surface of one or more coils of the evaporator 216) and working fluid passing through the interior of the evaporator 216. The evaporator 216 may include one or more circuits of coils. The evaporator 216 is fluidically connected to the compressor 206, such that working fluid generally flows from the evaporator 216 to the condensing unit 204 when the HVAC system 200 is operating to provide cooling.

A portion of the HVAC system 200 is configured to move airflow 218 provided by the blower 228 across the evaporator 216 and out of the duct sub-system 222 as conditioned airflow 220. Return air 224, which may be air returning from the building, fresh air from outside, or some combination, is pulled into a return duct 226. A suction side of the blower 228 pulls the return air 224. The blower 228 discharges airflow 218 into a duct 230 such that airflow 218 crosses the evaporator 216 or heating elements (not shown) to produce conditioned airflow 220. The blower 228 is any mechanism for providing airflow 218 through the HVAC system 200. For example, the blower 228 may be a constant speed or variable speed circulation blower or fan. Examples of a variable speed blower include, but are not limited to, belt-drive blowers controlled by inverters, direct-drive blowers with electronic commuted motors (ECM), or any other suitable type of blower.

The HVAC system 200 is in signal communication with one or more thermostats 134 using wired and/or wireless connection. The thermostat 134 may be located within a conditioned space (e.g., a room or building). The thermostat 134 may be a single-stage thermostat, a multi-stage thermostat, or any suitable type of thermostat as would be appreciated by one of ordinary skill in the art. The thermostat 134 is configured to allow a user to input a desired temperature or temperature set point for a designated space or zone such as the room.

Blower

Figure 3:
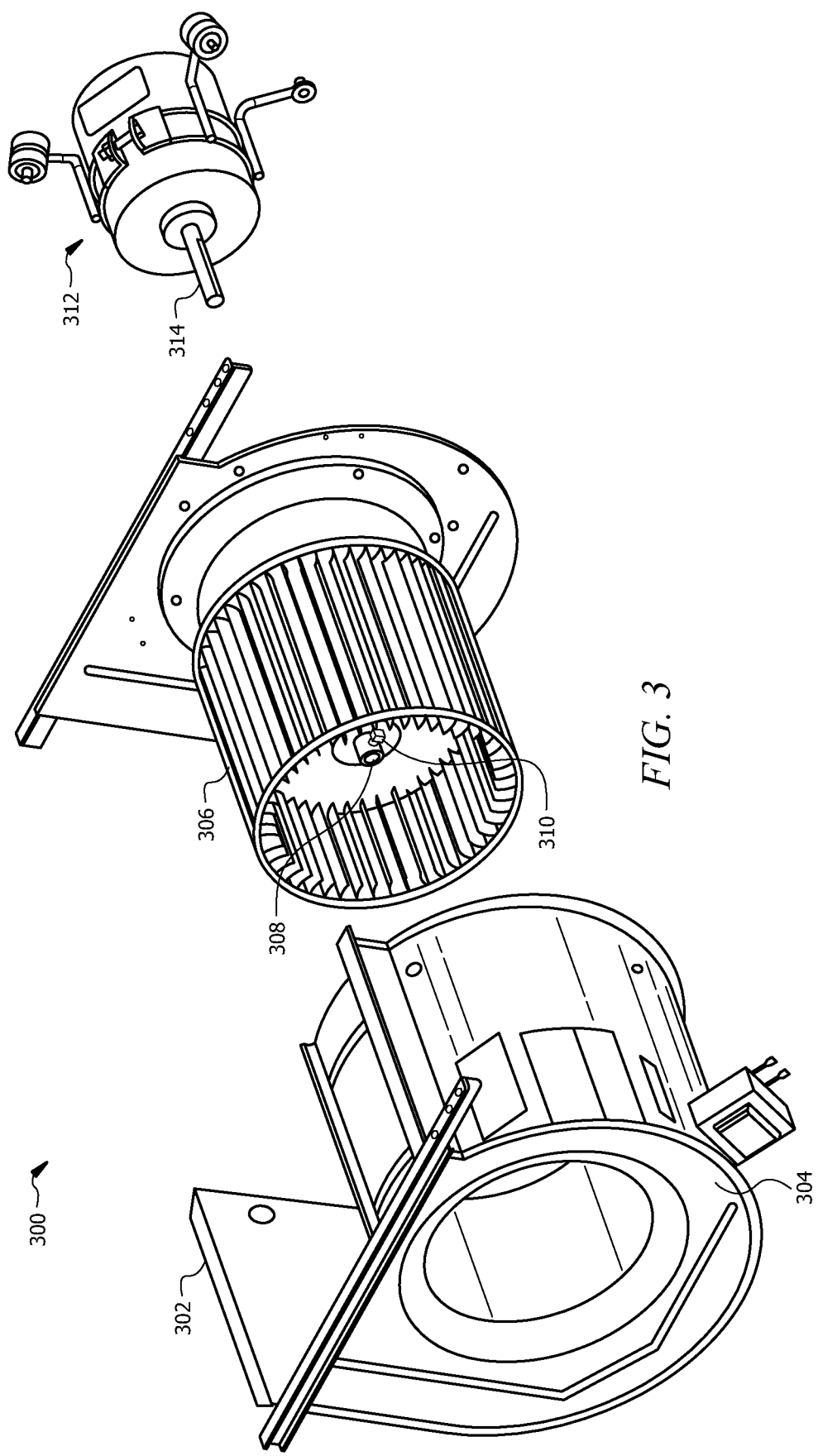
FIG. 3 is an exploded diagram of an embodiment of a blower of an HVAC system.

FIG. 3 is an exploded diagram of an embodiment of a blower 300 of an HVAC system. The blower may be used to implement the blower 150 (see FIG. 1) and/or the blower 228 (see FIG. 2).

In certain embodiments, the blower 300 comprises a housing 302, a blower wheel 306 and a motor 312. The motor 312 may be any suitable AC motor, such as a three-phase AC motor. The motor 312 comprises a shaft 314 that is inserted to a hole 308 of the blower wheel 306. A screw 310 is used to attach the blower wheel 306 to the shaft 314 of the motor 312. The motor 312 with the attached blower wheel 306 is placed in the housing 302. The screw 310 attaches the blower wheel 306 to the shaft 314 of the motor 312 such that the blower wheel 306 does not touch a bottom 304 of the housing 302, which allows the blower wheel 306 to rotate withing the housing 302 without hinderance.

In some embodiments, the screw 310 may be defective or may be defectively installed. In such embodiments, the screw 310 may become loose and may cause the blower wheel 306 to be loosely attached to the shaft 314 of the motor 312. Accordingly, a speed of the blower wheel 306 may not reach a desired value even if the motor 312 provides a proper torque to the blower wheel 306.

In some embodiments, depending on an orientation of the blower 300, the blower wheel 306 may detach from the shaft 314 of the motor 312 due to a gravitational force and may touch or make a physical contact with the bottom 304 of the housing 302. In such embodiments, due to friction between the blower wheel 306 and the bottom 304 of the housing 302, the blower 300 may generate an abnormal noise.

An Example Monitoring Process for a Blower of an HVAC System

Figure 4A:
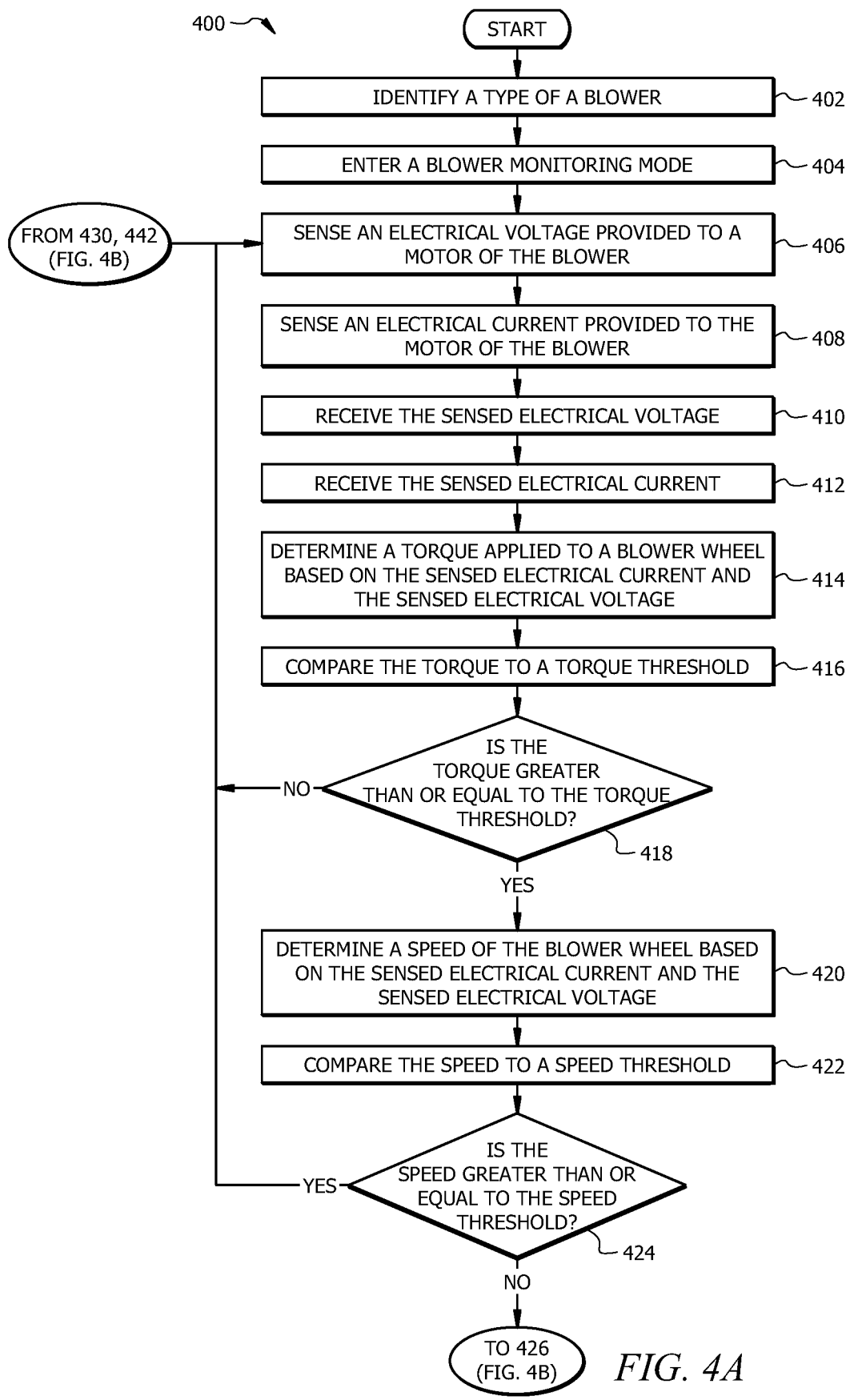
FIGS. 4A and 4B illustrate a flowchart of an embodiment of a monitoring process for a blower of an HVAC system.
Figure 4B:
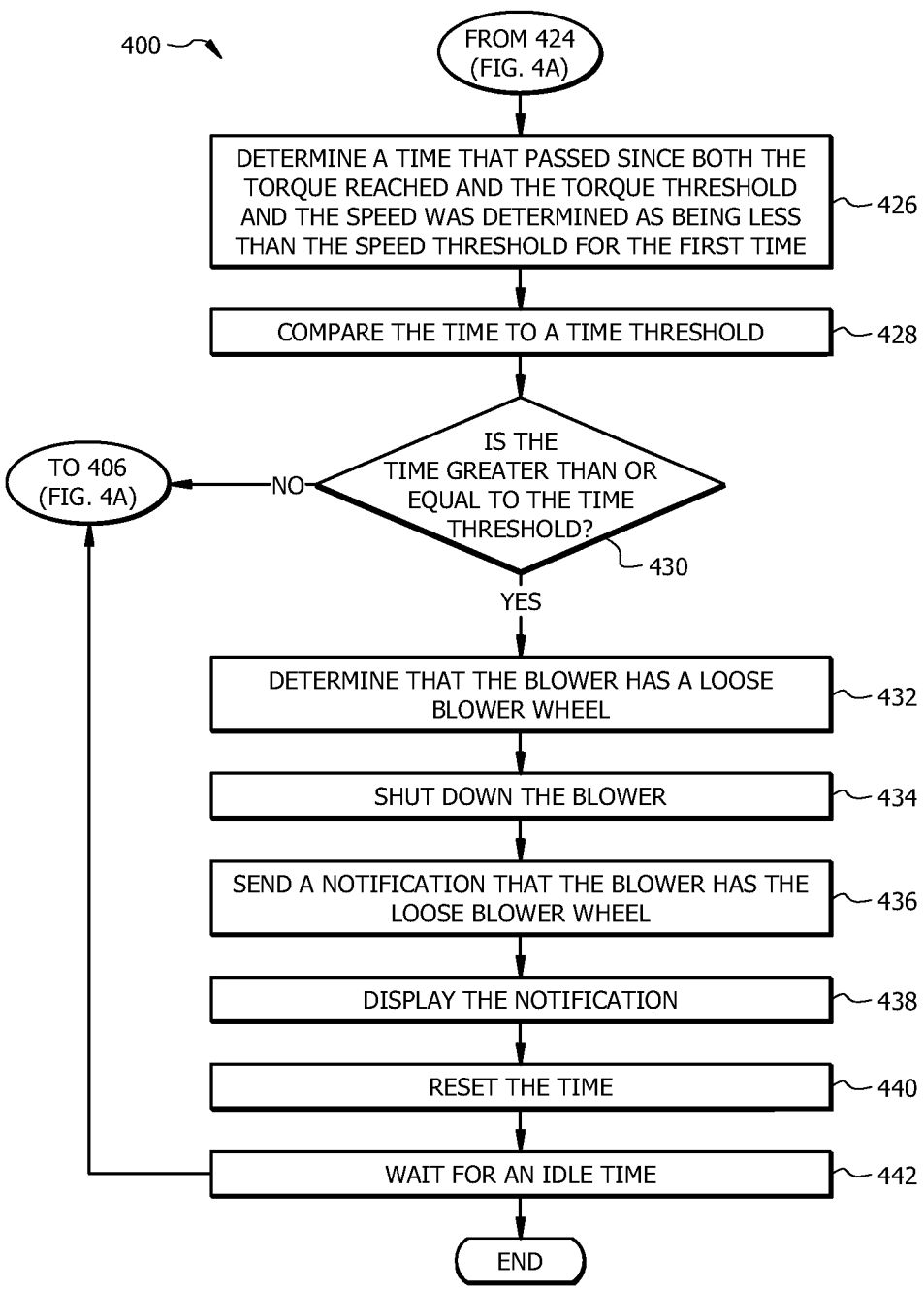

FIGS. 4A and 4B illustrate a flowchart of an embodiment of a monitoring process 400 for a blower of an HVAC system. Modifications, additions, or omissions may be made to monitoring process 400. Monitoring process 400 may include more, fewer, or other operations. For example, operations may be performed in parallel or in any suitable order. For example, one or more operations of monitoring process 400 may be implemented, at least in part, in the form of the software instructions (e.g., instructions 112, 144, and/or FAST observer library 114 of FIG. 1), stored on non-transitory, tangible, computer-readable medium (e.g., memories 110 and/or 142 of FIG. 1) that when executed by one or more processors (e.g., processors 106 and/or 136 of FIG. 1) may cause the one or more processors to perform operations 402-442.

The monitoring process 400 starts with operation 402, where a processor 106 of a monitoring system 104 identifies a blower type 116 of a blower 150 of an HVAC system 146. In certain embodiments, the processor 106 of the monitoring system 104 receives the blower type 116 from a thermostat 134. The blower type 116 may be a one horsepower (HP) blower, ¾ HP blower, or ½ HP blower.

At operation 404, the processor 106 of the monitoring system 104 enters a blower monitoring mode.

At operation 406, an electrical voltage sensor 156 senses an electrical voltage 164 provided to a motor 160 of the blower 150. In certain embodiments, the electrical voltage 164 is a three-phase electrical voltage and comprises voltages 164a, 164b, and 164c corresponding to respective phases.

At operation 408, an electrical current sensor 158 senses an electrical current 166 provided to the motor 160 of the blower 150. In certain embodiments, the electrical current 166 is a three-phase electrical voltage and comprises current 164a, 164b, and 164c corresponding to respective phases.

At operation 410, the processor 106 of the monitoring system 104 receives the sensed electrical voltage 164 from the electrical voltage sensor 156.

At operation 412, the processor 106 of the monitoring system 104 receives the sensed electrical current 166 from the electrical current sensor 158.

At operation 414, the processor 106 of the monitoring system 104 determines a torque 120 applied to a blower wheel 162 based on the sensed electrical current 166 and the sensed electrical voltage 164. In certain embodiments, the processor 106 of the monitoring system 104 executes the FAST observer library 114 to determine the torque 120.

At operation 416, the processor 106 of the monitoring system 104 compares the torque 120 to a torque threshold 122. In certain embodiments, the torque threshold 122 equal to 15% of a nominal torque 118. In embodiments when the blower 150 is 1 HP blower, the nominal torque 118 is 85 ounce-feet (oz-ft) and the torque threshold 122 is 12.75 oz-ft. In embodiments when the blower 150 is ¾ HP blower, the nominal torque 118 is 63 ounce-feet (oz-ft) and the torque threshold 122 is 9.45 oz-ft. In embodiments when the blower 150 is ½ HP blower, the nominal torque 118 is 42 ounce-feet (oz-ft) and the torque threshold 122 is 6.3 oz-ft.

At operation 418, the processor 106 of the monitoring system 104 determines if the torque 120 is greater than or equal to the torque threshold 122.

In response to determining at operation 418 that the torque 120 is less than the torque threshold 122, monitoring process 400 goes back to operation 406. In certain embodiments, operations 406 through 418 are repeated one or more times until the torque 120 is greater than or equal to the torque threshold 122.

In response to determining at operation 418 that the torque 120 is greater than or equal to the torque threshold 122, monitoring process 400 continues to operation 420. At operation 420, the processor 106 of the monitoring system 104 determines a speed 124 of the blower wheel 162 based on the sensed electrical current 166 and the sensed electrical voltage 164. In certain embodiments, the processor 106 of the monitoring system 104 executes the FAST observer library 114 to determine speed 124 of the blower wheel 162.

At operation 422, the processor 106 of the monitoring system 104 compares the speed 124 to a speed threshold 126. In one embodiment, the speed threshold 126 is 52.5 revolutions per minute (rpm).

At operation 424, the processor 106 of the monitoring system 104 determines if the speed 124 is greater than or equal to the speed threshold 126.

In response to determining at operation 424 that the speed 124 is greater than or equal to the speed threshold 126, monitoring process 400 goes back to operation 406. In certain embodiments, operations 406 through 424 are repeated one or more times until the speed 124 is less than the speed threshold 126.

In response to determining at operation 424 that the speed 124 is less than the speed threshold 126, monitoring process 400 continues to operation 426. At operation 426, the processor 106 of the monitoring system 104 determines a time 128 that passed since both the torque 120 reached the torque threshold 122 and the speed 124 was determined as being less than the speed threshold 126 for the first time.

At operation 428, the processor 106 of the monitoring system 104 compares the time 128 to a time threshold 130. In one embodiment, the time threshold 130 is 180 sec.

At operation 430, the processor 106 of the monitoring system 104 determines if the time 128 is greater than or equal to the time threshold 130.

In response to determining at operation 430 that the time 128 is less than the time threshold 130, monitoring process 400 goes back to operation 406. In certain embodiments, operations 406 through 430 are repeated one or more times until the time 128 is greater than or equal to the time threshold 130.

In response to determining at operation 430 that the time 128 is greater than or equal to the time threshold 130, monitoring process 400 continues to operation 432. At operation 432, the processor 106 of the monitoring system 104 determines that the blower 150 has a loose blower wheel 162.

At operation 434, the processor 106 of the monitoring system 104 shuts down the blower 150.

At operation 436, the processor 106 of the monitoring system 104 sends a notification 168 to the thermostat 134 that the blower 150 has the loose blower wheel 162.

At operation 438, the thermostat 134 displays the notification 168. In certain embodiments, a processor 136 of the thermostat 134 instructs a display 138 of the thermostat 134 to display the notification 168.

At operation 440, the processor 106 of the monitoring system 104 resets the time 128.

At operation 442, the processor 106 of the monitoring system 104 waits for an idle time 132. In one embodiment, idle time 132 is 10 min. After performing operation 442, monitoring process 400 goes back to operation 406. In certain embodiments, operations 406 through 442 are repeated one or more times. Monitoring process 400 may end when monitoring of the blower 150 is no longer needed. In certain embodiments, monitoring process 400 allows for detecting the loose blower wheel 162 before the malfunctioning of the blower wheel 162 results in an abnormal noise while operating the blower 150.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a heating, ventilation, and air conditioning (HVAC) system comprising:
a blower comprising:
a motor; and
a blower wheel attached to the motor;
a current sensor communicatively coupled to the blower, wherein the current sensor is configured to sense an electrical current provided to the motor; and
a voltage sensor communicatively coupled to the blower, wherein the voltage sensor is configured to sense an electrical voltage provided to the motor; and
a monitoring system communicatively coupled to the blower, wherein the monitoring system comprises:
a memory configured to store:
a torque threshold;
a speed threshold; and
a time threshold; and
a processor communicatively coupled to the memory, wherein the processor is configured to:
enter a blower monitoring mode;
receive a first sensed electrical current from the current sensor;
receive a first sensed electrical voltage from the voltage sensor;
determine a first torque applied to the blower wheel based on the first sensed electrical current and the first sensed electrical voltage;
compare the first torque to the torque threshold; and
in response to determining that the first torque is greater than or equal to the torque threshold:
determine a first speed of the blower wheel based on the first sensed electrical current and the first sensed electrical voltage;
compare the first speed to the speed threshold; and
in response to determining that the first speed is less than the speed threshold:

determine a first time that passed since both the first torque reached the torque threshold and the first speed was identified as being less than the speed threshold;
compare the first time to the time threshold; and
in response to determining that the first time is greater than or equal to the time threshold, determine that the blower wheel is loose.

2. The system of claim 1, wherein the processor is further configured to, in response to determining that the first time is greater than or equal to the time threshold:
shut down the blower; and
send a notification that the blower wheel is loose.

3. The system of claim 1, wherein the processor is further configured to, in response to determining that the first speed is greater than or equal to the speed threshold:
receive a second sensed electrical current from the current sensor;
receive a second sensed electrical voltage from the voltage sensor;
determine a second torque applied to the blower wheel based on the second sensed electrical current and the second sensed electrical voltage;
compare the second torque to the torque threshold; and
in response to determining that the second torque is greater than or equal to the torque threshold:
determine a second speed of the blower wheel based on the second sensed electrical current and the second sensed electrical voltage;
compare the second speed to the speed threshold; and
in response to determining that the second speed is less than the speed threshold:
determine a second time that passed since both the second torque reached the torque threshold and the second speed was identified as being less than the speed threshold;
compare the second time to the time threshold; and
in response to determining that the second time is greater than or equal to the time threshold, determine that the blower wheel is loose.

4. The system of claim 1, wherein the processor is further configured to, in response to determining that the first torque is less than the torque threshold:
receive a second sensed electrical current from the current sensor;
receive a second sensed electrical voltage from the voltage sensor;
determine a second torque applied to the blower wheel based on the second sensed electrical current and the second sensed electrical voltage;
compare the second torque to the torque threshold; and
in response to determining that the second torque is greater than or equal to the torque threshold:
determine a second speed of the blower wheel based on the second sensed electrical current and the second sensed electrical voltage;
compare the second speed to the speed threshold; and
in response to determining that the second speed is less than the speed threshold:
determine a second time that passed since both the second torque reached the torque threshold and the second speed was identified as being less than the speed threshold;
compare the second time to the time threshold; and
in response to determining that the second time is greater than or equal to the time threshold, determine that the blower wheel is loose.

5. The system of claim 1, wherein the processor is further configured to determine a type of the blower, wherein the torque threshold, the speed threshold and the time threshold correspond to the determined type.

6. The system of claim 1, wherein the first sensed electrical current comprises a first phase electrical current, a second phase electrical current, and a third phase electrical current.

7. The system of claim 1, wherein the first sensed electrical voltage comprises a first phase electrical voltage, a second phase electrical voltage, and a third phase electrical voltage.

8. A method comprising:
entering a blower monitoring mode for a blower of a heating, ventilation, and air conditioning (HVAC) system;
receiving a first electrical current that is provided to a motor of the blower;
receiving a first electrical voltage that is provided to a motor of the blower;
determining a first torque applied to a blower wheel of the blower based on the first electrical current and the first electrical voltage;
comparing the first torque to a torque threshold; and
in response to determining that the first torque is greater than or equal to the torque threshold:
determining a first speed of the blower wheel based on the first electrical current and the first electrical voltage;
comparing the first speed to a speed threshold; and
in response to determining that the first speed is less than the speed threshold:
determining a first time that passed since both the first torque reached the torque threshold and the first speed was identified as being less than the speed threshold;
comparing the first time to a time threshold; and
in response to determining that the first time is greater than or equal to the time threshold, determining that the blower wheel is loose.

9. The method of claim 8, further comprising:
in response to determining that the first time is greater than or equal to the time threshold:
shutting down the blower; and
sending a notification that the blower wheel is loose.

10. The method of claim 8, further comprising:
in response to determining that the first speed is greater than or equal to the speed threshold:
receiving a second electrical current that is provided to the motor of the blower;
receiving a second electrical voltage that is provided to a motor of the blower;
determining a second torque applied to the blower wheel based on the second electrical current and the second electrical voltage;
comparing the second torque to the torque threshold; and
in response to determining that the second torque is greater than or equal to the torque threshold:
determining a second speed of the blower wheel based on the second electrical current and the second electrical voltage;
comparing the second speed to the speed threshold; and
in response to determining that the second speed is less than the speed threshold:

determining a second time that passed since both the second torque reached the torque threshold and the second speed was identified as being less than the speed threshold;
comparing the second time to the time threshold; and
in response to determining that the second time is greater than or equal to the time threshold, determining that the blower wheel is loose.

11. The method of claim 8, further comprising:
in response to determining that the first torque is less than the torque threshold:
receiving a second electrical current that is provided to the motor of the blower;
receiving a second electrical voltage that is provided to a motor of the blower;
determining a second torque applied to the blower wheel based on the second electrical current and the second electrical voltage;
comparing the second torque to the torque threshold; and
in response to determining that the second torque is greater than or equal to the torque threshold:
determining a second speed of the blower wheel based on the second electrical current and the second electrical voltage;
comparing the second speed to the speed threshold; and
in response to determining that the second speed is less than the speed threshold:
determining a second time that passed since both the second torque reached the torque threshold and the second speed was identified as being less than the speed threshold;
comparing the second time to the time threshold; and
in response to determining that the second time is greater than or equal to the time threshold, determining that the blower wheel is loose.

12. The method of claim 8, further comprising:
determining a type of the blower, wherein the torque threshold, the speed threshold and the time threshold correspond to the determined type.

13. The method of claim 8, wherein the first electrical current comprises a first phase electrical current, a second phase electrical current, and a third phase electrical current.

14. The method of claim 8, wherein the first electrical voltage comprises a first phase electrical voltage, a second phase electrical voltage, and a third phase electrical voltage.

15. A non-transitory computer-readable medium storing instructions that, when executed by one or more processors, cause the one or more processors to:
enter a blower monitoring mode for a blower of a heating, ventilation, and air conditioning (HVAC) system;
receive a first electrical current that is provided to a motor of the blower;
receive a first electrical voltage that is provided to a motor of the blower;
determine a first torque applied to a blower wheel of the blower based on the first electrical current and the first electrical voltage;
compare the first torque to a torque threshold; and
in response to determining that the first torque is greater than or equal to the torque threshold:
determine a first speed of the blower wheel based on the first electrical current and the first electrical voltage;
compare the first speed to a speed threshold; and
in response to determining that the first speed is less than the speed threshold:
determine a first time that passed since both the first torque reached the torque threshold and the first speed was identified as being less than the speed threshold;
compare the first time to a time threshold; and
in response to determining that the first time is greater than or equal to the time threshold, determine that the blower wheel is loose.

16. The non-transitory computer-readable medium of claim 15, wherein the instructions, when executed by the one or more processors, further cause the one or more processors to:
in response to determining that the first time is greater than or equal to the time threshold:
shut down the blower; and
send a notification that the blower wheel is loose.

17. The non-transitory computer-readable medium of claim 15, wherein the instructions, when executed by the one or more processors, further cause the one or more processors to:
in response to determining that the first speed is greater than or equal to the speed threshold:
receive a second electrical current that is provided to the motor of the blower;
receive a second electrical voltage that is provided to a motor of the blower;
determine a second torque applied to the blower wheel based on the second electrical current and the second electrical voltage;
compare the second torque to the torque threshold; and
in response to determining that the second torque is greater than or equal to the torque threshold:
determine a second speed of the blower wheel based on the second electrical current and the second electrical voltage;
compare the second speed to the speed threshold; and
in response to determining that the second speed is less than the speed threshold:
determine a second time that passed since both the second torque reached the torque threshold and the second speed was identified as being less than the speed threshold;
compare the second time to the time threshold; and
in response to determining that the second time is greater than or equal to the time threshold, determine that the blower wheel is loose.

18. The non-transitory computer-readable medium of claim 15, wherein the instructions, when executed by the one or more processors, further cause the one or more processors to:
in response to determining that the first torque is less than the torque threshold:
receive a second electrical current that is provided to the motor of the blower;
receive a second electrical voltage that is provided to a motor of the blower;
determine a second torque applied to the blower wheel based on the second electrical current and the second electrical voltage;
compare the second torque to the torque threshold; and
in response to determining that the second torque is greater than or equal to the torque threshold:

determine a second speed of the blower wheel based on the second electrical current and the second electrical voltage;

compare the second speed to the speed threshold; and in response to determining that the second speed is less than the speed threshold:

determine a second time that passed since both the second torque reached the torque threshold and the second speed was identified as being less than the speed threshold;

compare the second time to the time threshold; and in response to determining that the second time is greater than or equal to the time threshold, determine that the blower wheel is loose.

19. The non-transitory computer-readable medium of claim 15, wherein the instructions, when executed by the one or more processors, further cause the one or more processors to:

determine a type of the blower, wherein the torque threshold, the speed threshold and the time threshold correspond to the determined type.

20. The non-transitory computer-readable medium of claim 15, wherein the first electrical current comprises a first phase electrical current, a second phase electrical current, and a third phase electrical current.

* * * * *